United States Patent
Muramoto

(10) Patent No.: US 8,711,695 B2
(45) Date of Patent: Apr. 29, 2014

(54) TRANSMITTER AND RECEIVER FOR STREAMING MEDIA INCLUDING PACKET PADDING

(75) Inventor: Eiichi Muramoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 158 days.

(21) Appl. No.: 13/121,798

(22) PCT Filed: Oct. 13, 2009

(86) PCT No.: PCT/JP2009/005329
§ 371 (c)(1),
(2), (4) Date: Mar. 30, 2011

(87) PCT Pub. No.: WO2010/070793
PCT Pub. Date: Jun. 24, 2010

(65) Prior Publication Data
US 2011/0243130 A1    Oct. 6, 2011

(30) Foreign Application Priority Data

Dec. 19, 2008    (JP) ................................ P2008-324609

(51) Int. Cl.
*H04L 12/26* (2006.01)
(52) U.S. Cl.
USPC ......................................... 370/231; 709/233
(58) Field of Classification Search
None
See application file for complete search history.

(56) References Cited

U.S. PATENT DOCUMENTS

| | | | |
|---|---|---|---|
| 5,691,820 A | 11/1997 | Komatsu | |
| 5,802,064 A * | 9/1998 | Lieberman | 370/469 |
| 6,301,620 B1 * | 10/2001 | Yoshida et al. | 709/235 |
| 6,738,347 B1 * | 5/2004 | Mio et al. | 370/230 |
| 7,474,664 B2 * | 1/2009 | Yasukawa et al. | 370/395.6 |
| 7,817,642 B2 * | 10/2010 | Ma et al. | 370/395.4 |

(Continued)

FOREIGN PATENT DOCUMENTS

| | | |
|---|---|---|
| CN | 1433195 A | 7/2003 |
| CN | 1543162 A | 11/2004 |

(Continued)

OTHER PUBLICATIONS

Schulzrinne et al., RTP: A Transport Protocol for Real-Time Applications, RFC 3550, Jul. 2003.*

(Continued)

*Primary Examiner* — Timothy J Weidner
(74) *Attorney, Agent, or Firm* — Pearne & Gordon LLP

(57) ABSTRACT

A problem of the invention is to provide a transmitter terminal and a receiver terminal that can realize transmission of a real-time stream as the final transmission delay time is shortened by avoiding occurrence of reorder. In a transmitter terminal (1), a padding request accepting section (103) receives a padding request packet transmitted from a receiver terminal (2) and a packet padding section (102) pads the packet generated in a data generating section (101) so that the packet length becomes a specific length or more based on a command from the padding request accepting section (103), and transmits the packet to a network (10). In the receiver terminal (2), a reorder condition analyzing section (201) receives a packet from the network (10) and analyzes the occurrence condition of reorder of the packet, a padding requesting section (204) generates a padding request packet for requesting the transmitter terminal (1) to execute padding based on the analysis result of the reorder condition analyzing section (201), and a data reproducing section (203) reproduces the packet received in the reorder condition analyzing section (201).

3 Claims, 8 Drawing Sheets

(56) References Cited

U.S. PATENT DOCUMENTS

| | | | |
|---|---|---|---|
| 7,903,550 B2 * | 3/2011 | Schmidt et al. | 370/230 |
| 8,045,654 B1 * | 10/2011 | Anderson | 375/342 |
| 2003/0103243 A1 | 6/2003 | Watanabe et al. | |
| 2003/0142669 A1 | 7/2003 | Kubota et al. | |
| 2006/0002416 A1 | 1/2006 | Yagihashi | |
| 2006/0139201 A1 * | 6/2006 | Nagata et al. | 342/1 |
| 2008/0019389 A1 * | 1/2008 | Barrass | 370/463 |
| 2008/0267140 A1 | 10/2008 | Lee et al. | |
| 2009/0092079 A1 * | 4/2009 | Marinier et al. | 370/328 |
| 2009/0196364 A1 * | 8/2009 | Nakajima et al. | 375/260 |

FOREIGN PATENT DOCUMENTS

| | | |
|---|---|---|
| CN | 1716835 A | 1/2006 |
| CN | 1906907 A | 1/2007 |
| CN | 101193060 A | 6/2008 |
| CN | 101286745 A | 10/2008 |
| JP | 2-2762 A | 1/1990 |
| JP | 5-56079 A | 3/1993 |
| JP | 7-107255 A | 4/1995 |
| JP | 11-46186 A | 2/1999 |
| JP | 2003-169090 A | 6/2003 |

OTHER PUBLICATIONS

International Search Report for PCT/JP2009/005329 dated Nov. 24, 2009.

Chinese Office Action Report for Application No. 200980151113.9 dated Jun. 3, 2013.

Chinese Office Action for Application No. 200980151139 dated Feb. 8, 2014.

* cited by examiner

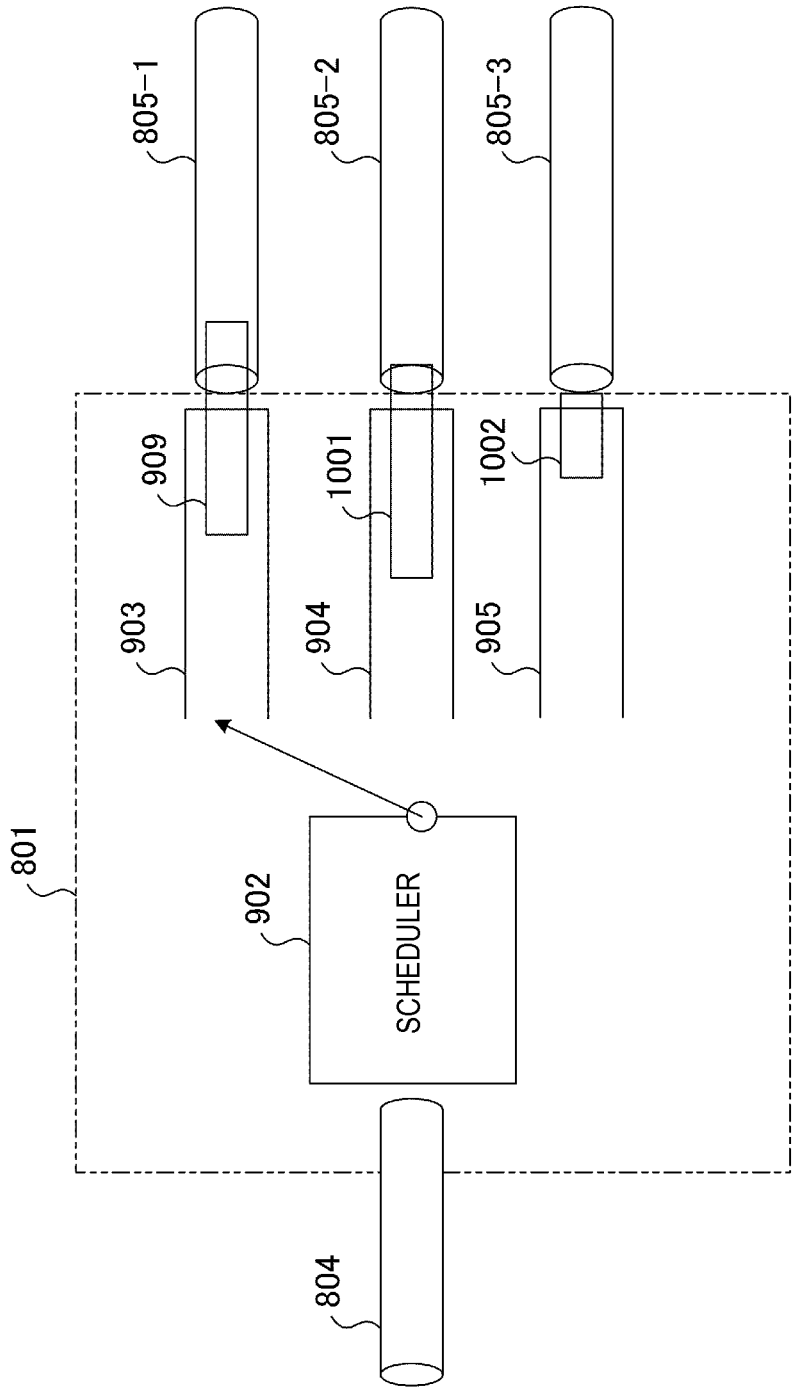

TRANSMITTER AND RECEIVER FOR STREAMING MEDIA INCLUDING PACKET PADDING

TECHNICAL FIELD

This invention relates to a transmitter terminal for transmitting streaming data in real time such as audio and video through a network for conducting a packet communication of the Internet, etc., and a receiver terminal for receiving streaming data transmitted from the transmitter terminal.

BACKGROUND ART

FIG. 7 is a drawing to show the use state of the transmitter terminal and the receiver terminal mentioned above. In FIG. 7, a transmitter terminal 11 divides real-time stream data such as audio and video into packets for transmission to a receiver terminal 12 through a network 10.

A network of the Internet, etc., may be put into a wider bandwidth and a VPN (Virtual Private Network) router may be speeded up by performing link trunking or introducing a plurality of encryption devices. FIG. 8 is a drawing to show an example. In FIG. 8, routers (relays) 801, 802, and 803 placed in a network intervene between the transmitter terminal 11 and the receiver terminal 12. In FIG. 8, the transmitter terminal 11 and the router 801 are connected by a link 804, the router 801 and the router 802 are connected by a link 805, the router 802 and the router 803 are connected by a link 806, and the receiver terminal 12 and the router 803 are connected by a link 807. In such a network, for example, if the bandwidth of the link 805 becomes insufficient because of an increase in the traffic, a method of bundling a plurality of links to ensure the bandwidth may be adopted. This is called link trunking. The link 805 shows a state in which a plurality of links are bundled.

FIG. 9 is a drawing to show a state of link selection of the router 801 where link trunking is performed in more detail. In the figure, four links 804, 805-1, 805-2, and 805-3 are connected to the router 801. The router 801 has output queues 903, 904, and 905 for the links 804 and 805-1 to 805-3. A scheduler 902 of the router 801 has a function of determining the output link of a packet. Packets 909, 1001, and 1002 different in length are output from the output queues 903, 904, and 905 to the links. That is, the packet 909 is output from the output queue 903 to the link 805-1, and the packet 1001 is output from the output queue 904 to the link 805-2. The packet 1002 is output from the output queue 905 to the link 805-3.

In FIG. 8, when a packet is input from the link 804, etc., the router 801 executes routing and determines transmission of the packet to the destination of the routing result using the link 805, namely, any of the links 805-1 to 805-3 in FIG. 9. The scheduler 902 of the router 801 determines which of the links 805-1, 805-2, and 805-3 is to be used, and stores the packet in the output queue corresponding to the determined link. At this time, which link is selected is determined by the value set in the router 801. Specifically, a round robin system of selecting a link to store the packet in order and a system of calculating the hash value in a specific area in the packet and selecting the link according to the hash value are known. The packets stored in the output queues 903, 904, and 905 are transferred to the associated router (in FIG. 8, the router 802) through each link in sequence (First In First Out) in response to the link speed.

Inversion of the packet reception order may occur between the routers where such link trunking is performed. In the description, reorder of packet is defined as transmission of the packet while the packet transmission order output by the transmitter terminal and the reception order of the packet received by the receiver terminal differ. In the example in FIG. 9, although the packets 909, 1001, and 1002 are transmitted in this order from the transmitter terminal 11, these packets are received at the receiver terminal 12 in the order of the packets 909, 1002, and 1001. This is a representative example wherein reorder occurs because of link trunking.

In addition, it is assumed that measures are taken for preventing content of data from being seen if network snooper obtains the data at a network link by conducting encryption between the router 801 and the router 803. If transmission between the transmitter terminal 11 and the receiver terminal 12 is put into a wider bandwidth under such an operation condition, the capability of encryption and decryption installed in the routers 801 and 803 may become insufficient. Thus, a plurality of hardware devices of encryption and decryption are installed in the routers 801 and 803 and encryption and decryption processing is assigned to the devices for each arrival packet, whereby encryption and decryption processing may be speeded up. If a plurality of hardware devices for encryption and decryption are installed in the routers 801 and 803, reorder may occur. The encryption and decryption processing time generally is prolonged in response to the packet length. That is, in encryption and decryption processing of the routers 801 and 803, if encryption and decryption processing is started roughly at the same time, processing of a shorter packet may terminate in a shorter time than processing of a longer packet. If a short packet arrives at such a router from a specific transmitter terminal, reorder may occur.

In transmission of streaming data in real time such as audio and video, it becomes necessary for a receiver terminal where reorder occurs to sort the packets. That is, a decoder for audio and video in the receiver terminal decodes the audio and video to reproduce the audio and video in the input information order. In the receiver terminal, data whose order is replaced is input to the decoder, usually, decoding of the audio and video does not normally terminate. Specifically, in the receiver terminal, when data whose order is replaced is input, for example, it is assumed that data pieces with sequential numbers 1, 2, and 3 are input to the decoder in the order of 1, 3, and 2. In this case, when receiving 3, the receiver terminal determines that 2 is lost and when inputting 2, the receiver terminal determines that invalid data is input; decoding is not normally performed and consequently, reproduction of the audio and video is temporarily interrupted. As a method to prevent such a situation, a method wherein packets are sorted in a receiver terminal disclosed in Patent Document 1 is known. According to the method, the receiver terminal references the sequential numbers in the packets and sorts the packets according to the numbers, whereby the packets can be input to the decoder as the data in the normal order.

RELATED ART DOCUMENTS

Patent Document

Patent Document 1: JP-A-5-056079

SUMMARY OF THE INVENTION

Problems to be Solved by the Invention

However, in the method of sorting the packets in the receiver terminal, there is a problem in that the final transmission delay time increases. In a system of transmitting real-time stream data such as audio and video, there is a demand for shortening the final transmission delay time. As application involving a demand for shortening the delay time, for example, communication application typified by a video telephone can be named. The final transmission delay time is time until data of audio and video encoded in a transmitter terminal is transmitted through a network and is decoded in the receiver terminal and is reproduced as audio and video. That is, if reorder occurs in the network, it becomes necessary for the receiver terminal to always store as many packets as the number of packets where there is a possibility that reorder may occur before inputting the packets to the decoder. Thus, in the method of always storing packets, the time of inputting each packet to the decoder delays as much as the time storing the packet.

In view of the circumstances described above, it is an object of the invention to provide a transmitter terminal and a receiver terminal that can realize transmission of a real-time stream as the final transmission delay time is shortened by avoiding occurrence of reorder.

Means for Solving the Problems

A transmitter terminal of the invention includes a data generating section that generates a packet, a padding request accepting section that receives a padding request packet for making a padding request, the padding request packet being transmitted from a receiver terminal, and a packet padding section that pads the packet generated by the data generating section so that a packet length of the packet becomes a specific length or more based on the padding request from the padding request accepting section, and transmits the packet to a network.

According to the configuration, upon reception of a padding request from the receiver terminal, the packet is padded so that the packet length of the packet generated in the data generating section becomes the specific length or more based on the request, and the packet is transmitted to the receiver terminal. Accordingly, the transmitter terminal of the invention can circumvent occurrence of reorder and makes it possible to transmit a real-time stream as the final transmission delay time is shortened.

In the transmitter terminal, the padding request packet contains a normal packet length with no occurrence of reorder calculated by the receiver terminal, and the packet padding section pads the packet generated by the data generating section so that the packet length of the packet becomes the normal packet length.

A receiver terminal of the invention includes a reorder condition analyzing section that receives a packet from a network and analyzes a occurrence condition of reorder of the packet, a data reproducing section that reproduces the packet received by the reorder condition analyzing section, and a padding requesting section that generates a padding request packet for requesting a transmitter terminal to execute a padding process based on an analysis result of the reorder condition analyzing section.

According to invention, whether or not reorder occurs in the packets sent from the transmitter terminal is analyzed. If reorder occurs, a padding request packet for requesting the transmitter terminal to execute padding is transmitted to the transmitter terminal. Accordingly, it is made possible for the transmitter terminal to transmit in the form in which the recorder occurrence cause is removed. It becomes unnecessary for the receiver terminal to store packets to sort them on the receiver terminal side and consequently, transmission of a real-time stream as the final transmission delay time is shorter is made possible.

In the receiver terminal, the reorder condition analyzing section estimates a predicted normal packet length from the number of reorder and reception bandwidth if reorder occurs.

A packet transmission and reception method of the invention includes a packet generation step of generating a packet by a transmitter terminal, a packet transmission step of padding the packet generated in the packet generation step and transmitting the packet to a network by the transmitter terminal, a reorder condition analysis step of receiving the packet from the network and analyzing an occurrence condition of reorder of the packet by a receiver terminal, a padding request packet generation step of generating a padding request packet for making a padding request based on an analysis result in the reorder condition analysis step by the receiver terminal, and a padding request packet acceptance step of receiving the padding request packet generated in the padding request packet generation step by the transmitter terminal. In the packet transmission step of the transmitter terminal, the packet generated in the data generation step is padded so that a packet length of the packet becomes a specific length or more based on the padding request in the padding request acceptance step.

According to this method, at the time of transmission, transmission can be executed in the form in which the recorder occurrence cause is removed; at the time of reception, it is not necessary to store packets to sort them and transmission of a real-time stream as the final transmission delay time is shorter is made possible.

A transmitter terminal of the invention includes a data generating section that generates a packet, a reorder predicting section that calculates a packet length of the packet to prevent reorder based on information of a transmission data amount of the packet generated by the data generating section and the number of burst transmission of the packet, and a packet padding section that pads the packet in accordance with the packet length calculated by the reorder predicting section and transmits the packet to a network and also generates information of the number of burst transmission and supplies the information to the reorder predicting section.

According to this configuration, at the time of transmission, transmission can be executed in the form in which the recorder occurrence cause is removed, and on the reception side, it is not necessary to store packets to sort them and transmission of a real-time stream as the final transmission delay time is shorter is made possible.

A packet transmission method of the invention includes a packet generation step of generating a packet, a packet length calculation step of calculating a packet length of the packet to prevent reorder based on information of a transmission data amount of the packet generated in the packet generation step and the number of burst transmission of the packet, and a packet transmission step of padding the packet in accordance with the packet length calculated in the packet length calculation step and transmitting the packet to a network and also generating information of the number of burst transmission.

According to this method, at the time of transmission, transmission can be executed in the form in which the recorder occurrence cause is removed, and on the reception side, it is not necessary to store packets to sort them and transmission of a real-time stream as the final transmission delay time is shorter is made possible.

Advantages of the Invention

In the invention, occurrence of reorder is avoided and it becomes fundamentally unnecessary for the receiver terminal to store packets to sort them and consequently, transmission of a real-time stream as the final transmission delay time is shorter can be realized.

BRIEF DESCRIPTION OF THE DRAWINGS

FIG. 9 is a drawing to show a state of link selection of a router where link trunking is performed.

BEST MODE FOR CARRYING OUT THE INVENTION

Preferred embodiments for carrying out the invention will be discussed below with reference to accompanying drawings:

Embodiment 1

Figure 1:
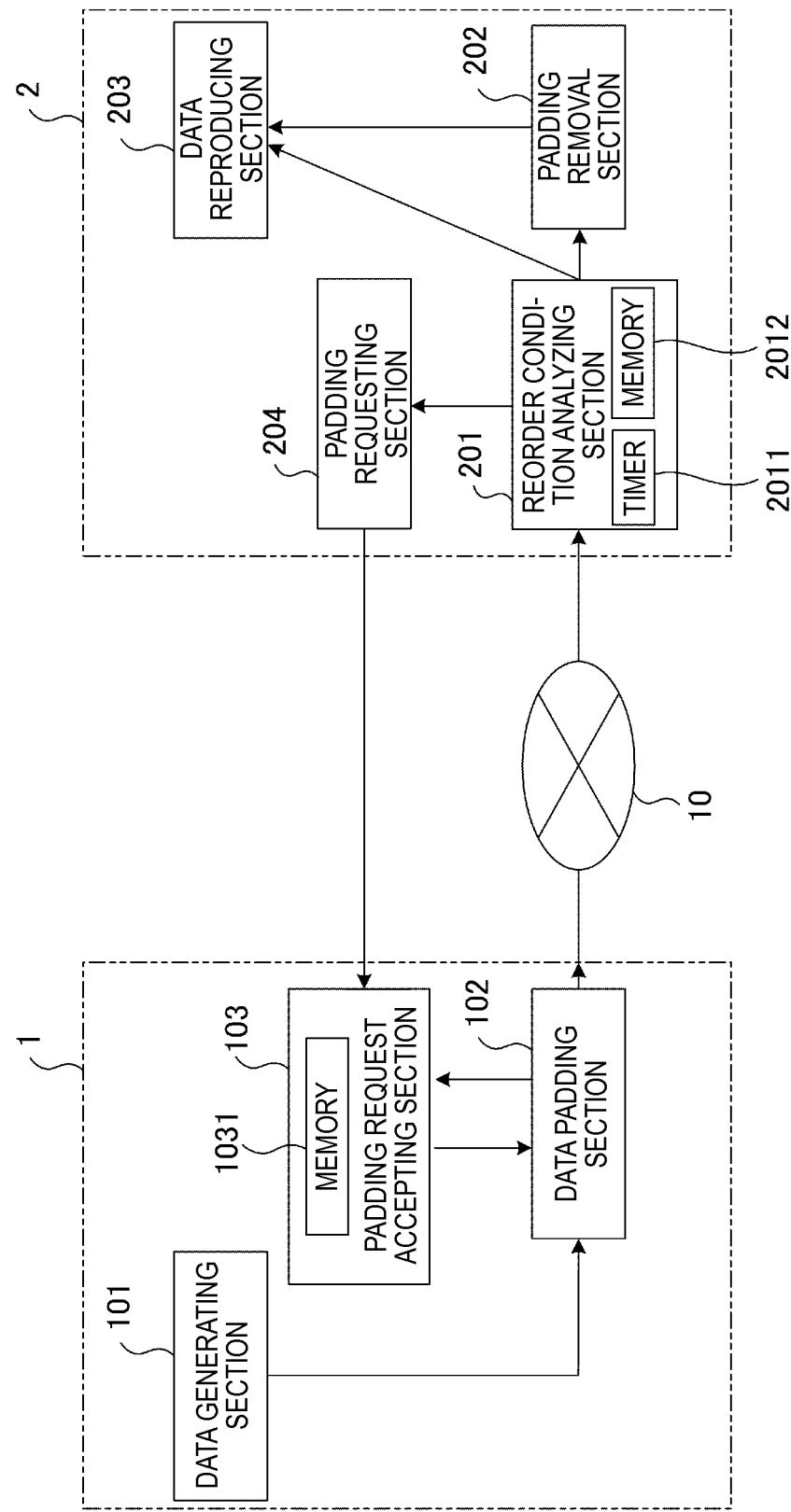
FIG. 1 is a block diagram to show the schematic configurations of a transmitter terminal and a receiver terminal according Embodiment 1 of the invention.

FIG. 1 is a block diagram to show the schematic configurations of a transmitter terminal and a receiver terminal according Embodiment 1 of the invention.

In FIG. 1, a transmitter terminal 1 includes a data generating section 101, a packet padding section 102, and a padding request accepting section 103. The data generating section 101 encodes data of audio and video, etc., and generates a packet. The packet padding section 102 pads the packet to a specific packet length and transmits the packet to a network 10. The padding request accepting section 103 receives a padding request packet and commands the packet padding section 102 to pad the packet to an appropriate length. The padding request accepting section 103 has memory 1031 for data storage.

To encode video, the data generating section 101 executes encode processing for each specific data unit. Specifically, it executes encode processing in one screen unit or slice units into which one screen is divided. At this time, in the encode processing, the data amount occurring per processing unit varies depending on the complicity of the screen and the required definition. Thus, the data generating section 101 divides data occurring for each processing unit into the length of a specific length (Lmax). Next, the data generating section 101 generates data as a plurality of packets given a header for transmission in a network 10 for each divided data unit and passes the packets to the packet padding section 102. At this time, the sequential number indicating the packet generation order (namely, reproduction order) is given to the header. The header may be an RTP (Real-time Transport Protocol) header stipulated in RFC3550 or may be a uniquely defined header.

The packet padding section 102 pads each packet in accordance with a command of the padding request accepting section 103 and transmits the packet to the receiver terminal 2 through the network 10. The padding is processing of adding fixed data to a packet to a specific packet length. The padding processing may be realized with Pad1, PadN option header defined in IPv6 (Internet Protocol Version6), for example, (reference document: RFC2460). The padding processing may be implemented using a padding bit defined in RTP (reference document: RFC3550). To realize the padding processing with the Pad1, PadN option header, application of the receiver terminal is not conscious of padding and the padding is removed in the IP stack of the receiver terminal. To realize the padding processing with the padding bit defined in RTP, application of the receiver terminal 2 needs to remove the padding. The method of realizing the padding is not limited to them. If padding can be removed in the receiver terminal 2, it may be realized in a uniquely defined packet format.

The receiver terminal 2 includes a reorder condition analyzing section 201, a padding removal section 202, a data reproducing section 203, and a padding requesting section 204. The reorder condition analyzing section 201 has a timer 2011 for acquiring the reception time of a packet and memory 2012 for data storage. The padding removal section 202 removes the padding portion of a packet and passes the packet to the data reproducing section 203. The padding requesting section 204 generates a padding request packet based on the occurrence condition of reorder from the reorder condition analyzing section 201 and feeds back the packet to the transmitter terminal 1. The data reproducing section 203 decodes input packets in sequence and reproduces the packets as audio and video.

In the description of the embodiment, an example of realizing padding processing with a padding bit defined in RTP is assumed. A packet arriving at the receiver terminal 2 through the network 10 is received at the receiver terminal 2 and then is passed to the reorder condition analyzing section 201. The reorder condition analyzing section 201 observes the sequential number in the header of the packet, thereby detecting occurrence of reorder. Further, the reorder condition analyzing section 201 calculates normal packet length L with no occurrence of reorder at the reorder occurrence time and notifies the padding requesting section 204 of the calculated normal packet length L. The reorder condition analyzing section 201 passes the packet whose padding removal is required to the padding removal section 202 and passes the packet whose padding removal is not required to the data reproducing section 203.

Figure 2:
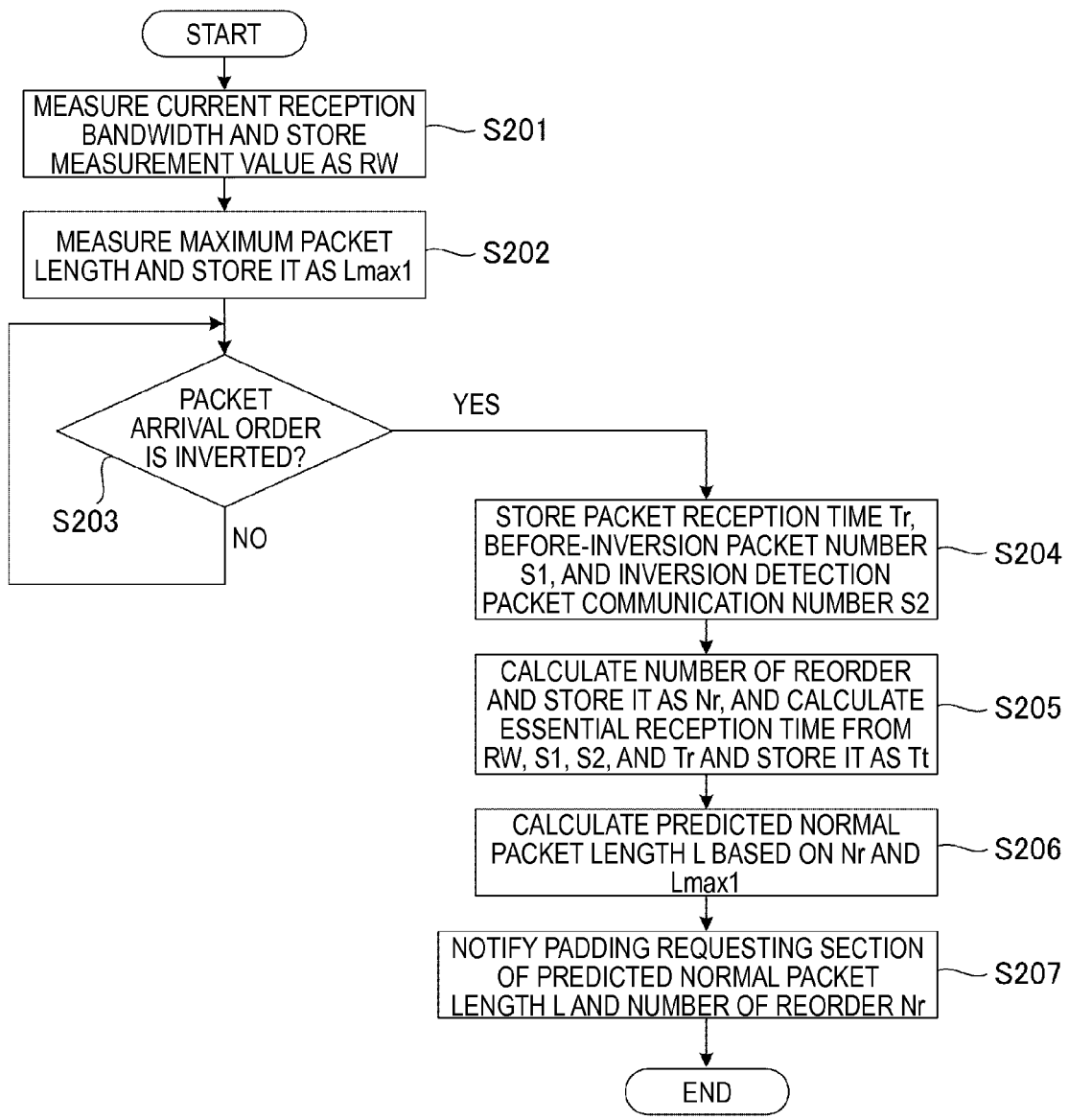
FIG. 2 is a flowchart to describe processing of a reorder condition analyzing section in the receiver terminal in FIG. 1.

Here, processing of the reorder condition analyzing section 201 will be discussed in detail with reference to a flowchart shown in FIG. 2. The reorder condition analyzing section 201 is started each time a packet is received. At step S201, the current reception bandwidth is measured and the measurement result is stored in the memory 2012 as RW. The reception bandwidth can be measured in the packet reception amount per unit time. Next, at step S202, the maximum packet length is measured and the measurement result is stored in the memory 2012 as Lmax1. The maximum packet length is the maximum length of the received packet lengths from the communication start. Next, at step S203, it is determined whether or not the packet arrival order is inverted. That is, in the determination processing, inversion of the sequential number in the packet is observed, whereby whether or not reorder occurs is determined. In the case, as the specific processing, if a packet having a smaller sequential number than the maximum value of the sequential numbers of the packets received in the past arrives, it is determined that the packet arrives with the arrival order inverted. The determination is made after lap round processing is performed so that the greater-than, equal-to, less-than relationship is not inverted by making one round of sequential numbers before the determination.

The lap round processing specifically can be realized by subtracting the specific same value from both of comparison, for example. If reorder occurs, the reorder condition analyzing section 201 estimates predicted normal packet length L from the number of reorder and the reception bandwidth and notifies the padding requesting section 204 of the predicted normal packet length L. The processing is steps S204 to S207 in FIG. 2. If it is determined at step S203 that reorder occurs (Yes), the process goes to step S204. Next, at step S204, packet reception time Tr, before-inversion packet number S1, and inversion detection packet communication number S2 are stored in the memory 2012. At step S204, the packet reception time Tr is acquired from the timer 2011.

Next, at step S205, the number of reorder (S1–S2) Nr is calculated and is stored in the memory 2012. At step S205, essential reception time Tt is calculated from the reception bandwidth RW, the before-inversion packet number S1, the inversion detection packet communication number S2, the packet reception time Tr, and the number of reorder Nr, and is stored in the memory 2012. Specifically, the essential reception time Tt is calculated as Tt=Tr+RW (Nr*Lmax)/8.

Next, at step S206, from the number of reorder Nr and the maximum packet length Lmax1, the predicted normal packet length L is calculated based on L=Lmax1−α/Nr. Next, at step S207, the padding requesting section 204 is notified of the calculated predicted normal packet length L and the number of reorder Nr. Here, α may be a positive constant or may be a function of time where the range becomes a positive value (Tt−Tr). For example, α is found as α=β*(Tt−Tr)*(Tt−Tr) (where β may be a positive constant).

Figure 3:
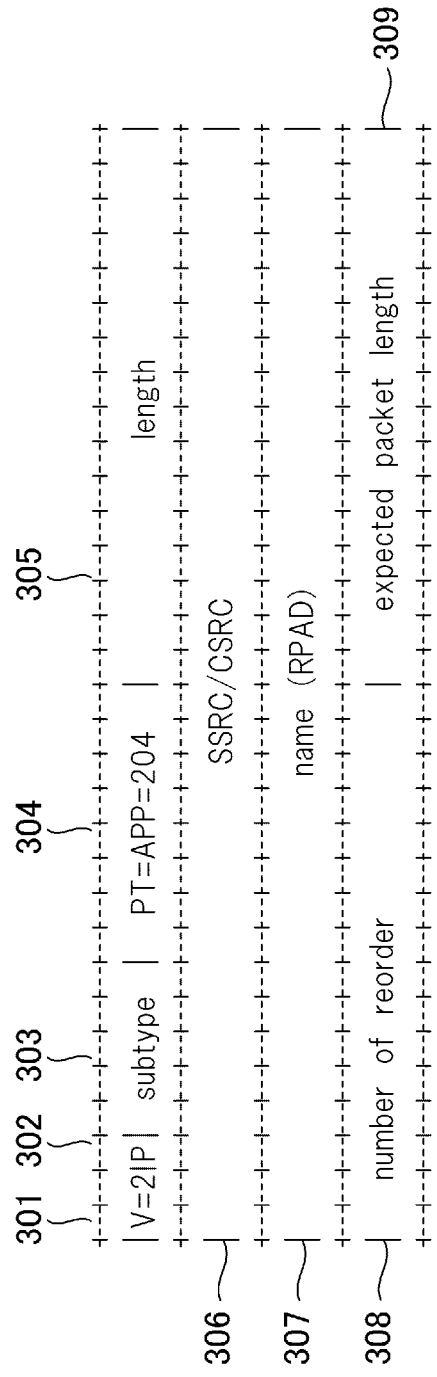
FIG. 3 is a drawing to schematically show an example of a padding request packet generated in a padding requesting section of the receiver terminal in FIG. 1.

Referring again to FIG. 1, when receiving the predicted normal packet length L and the number of reorder Nr from the reorder condition analyzing section 201, the padding requesting section 204 describes the information in a specific padding request packet and sends the packet to the transmitter terminal 1. Specifically, the packet may be formed in accordance with APP (Application Defined) format of RTCP stipulated in RFC3550. FIG. 3 shows an example of the packet format. In FIG. 3, fields 301 to 307 are as in the APP packet format stipulated in RFC3550. The APP packet format contains version number 301, padding bit 302, subtype 303, packet type PT 304, RTCP packet length 305, a transmitter identifier (SSRC (transmitting source identifier)/CSRC (contributing transmitting source identifier)) 306, and name (four bytes) 307. The subtype 303 may be "1," for example, but is not limited to it. The name 307 may be ASCII code corresponding four characters of RPAD, but is not limited to it. Fields 308 and 309 are added in the invention. The number of reorder Nr is stored in the field 308 and the predicted normal packet length L is stored in the field 309.

Figure 4:
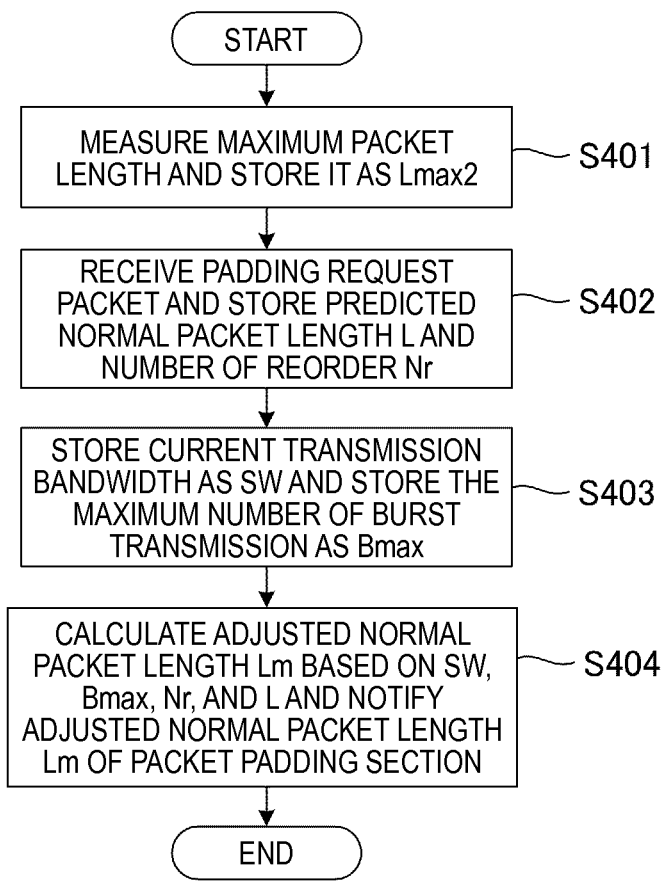
FIG. 4 is a flowchart to describe processing of a padding request accepting section in the transmitter terminal in FIG. 1.

When a padding request packet arrives at the transmitter terminal 1, the padding request accepting section 103 receives it. A flowchart shown in FIG. 4 shows details of processing of the padding request accepting section 103. At step S401, the padding request accepting section 103 acquires the maximum length of the packet being transmitted in current communications and stores it in the memory 1031 as Lmax2. The communication units are stipulated in transmission units of RTP packet stipulated in RFC3550. Specifically, transmission units of a video RTP packet and the transmission units of a sound RTP packet can be named. The packet padding section 102 retains the maximum length of the packets transmitted in the past in the communications. The value of the maximum length of the packets is reported based on a request of the padding request accepting section 103.

Next, at step S402, the padding request accepting section 103 stores the predicted normal packet length L and the number of reorder Nr described in the padding request packet in the memory 1031. Next, at step S403, the padding request accepting section 103 acquires current transmission bandwidth SW and the maximum number of burst transmission Bmax from the packet padding section 102 and stores them in the memory 1031. The packet padding section 102 takes the statistics of the packet transmission amount every given time. The current transmission bandwidth SW is provided by dividing the packet transmission amount by the observation interval. The packet padding section 102 determines whether or not N packets more than zero are transmitted every specific time based on token bucket. At this time, the packet padding section 102 records the maximum number of packets transmitted at a time within past specific time P in the same communication. The packet padding section 102 passes the maximum number of packets transmitted at a time to the padding request accepting section 103 as Bmax.

Next, at step S404, the padding request accepting section 103 calculates adjusted normal packet length Lm from the current transmission bandwidth SW, the maximum number of burst transmission Bmax, the number of reorder Nr, and predicted normal packet length L. The padding request accepting section 103 notifies the packet padding section 102 of the calculated adjusted normal packet length Lm, and terminates processing. The adjusted normal packet length Lm is calculated as Lm=L−β (Lmax2−L)/I (Nr/Bmax) where β is a constant satisfying 0≤β≤1 and I (x) is a function of taking a value of I (x)=1 (x≥1), x (0≤x≤1).

The packet padding section 102 pads the packet to be transmitted in accordance with the reported adjusted normal packet length Lm. Specifically, if the length of the packet to be transmission is less than Lm, the packet is padded so that the whole packet length becomes Lm. Specific processing of padding may use a method of using the PAD1, PADN option of IPv6 described above or a method of recording the presence or absence of padding in a packet using a padding bit of RTP and transmitting the padding length in the last byte.

The operation is performed as described in the Embodiment 1, whereby the transmitter terminal 1 pads a packet to the length with no occurrence of reorder in the network 10 and transmits the packet, so that occurrence of reorder in the network 10 is eliminated. It becomes unnecessary for the receiver terminal 2 to buffer packets to sort reordered packets. Consequently, transmission of a real-time stream as the final transmission delay time is shorter is made possible.

As the reorder occurrence factor, link trunking between routers is described, but the factor is not limited to the link trunking. For example, the reorder occurrence cause may be channel selection in a wireless network conducting communications using a plurality of channels. As another example, reorder may occur because of processing time lag of a plurality of invalid packet detection engines placed in a fire wall installed between an enterprise network and the Internet. In any case, the communication terminals of the embodiment operate effectively.

Embodiment 2

Figure 5:
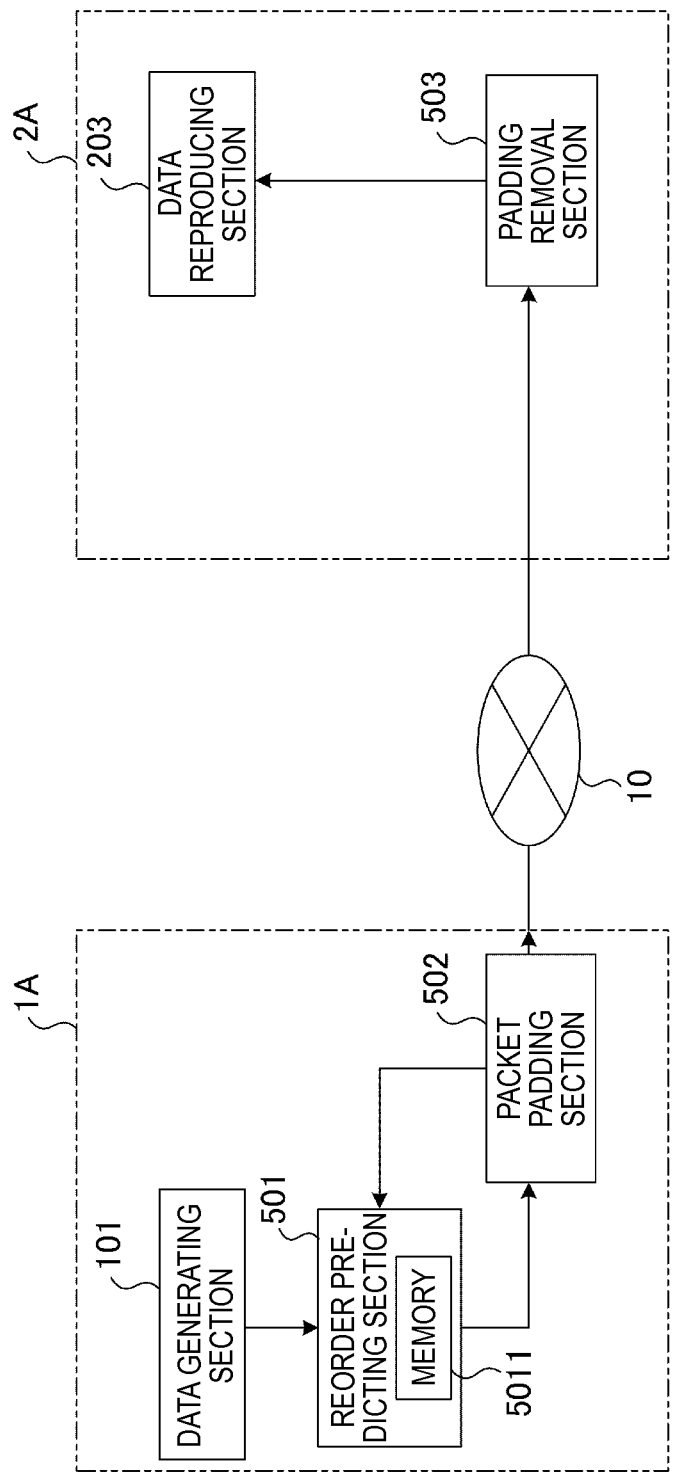
FIG. 5 is a block diagram to show the schematic configurations of a transmitter terminal and a receiver terminal according Embodiment 2 of the invention.

FIG. 5 is a block diagram to show the schematic configurations of a transmitter terminal and a receiver terminal according Embodiment 2 of the invention. Portions common to those previously described with reference to FIG. 1 are denoted by the same reference numerals in FIG. 5. In Embodiment 1 described above, the transmitter terminal 1 determines whether or not execution of padding is required based on padding request transmitted from the receiver terminal 2. Embodiment 2 differs from Embodiment 1 in that it is determined whether or not padding is required in a transmitter terminal 1A.

In FIG. 5, a reorder predicting section 501 of the transmitter terminal 1A predicts whether or not reorder will occur in a network 10. A packet padding section 502 has the same function as the packet padding section 102 in FIG. 1 and differs from the packet padding section 102 in that shaping timer granularity is given to the reorder predicting section 501. A padding removal section 503 of a receiver terminal 2A has the same function as the padding removal section 202 described in FIG. 1, but differs from the padding removal section 202 in that if a packet is received and padding removal is not required, the padding removal section 503 passes the received packet intact to a data reproducing section 203.

The reorder predicting section 501 receives the transmission bandwidth and the transmission data amount from the packet padding section 502 and predicts occurrence of reorder from the shaping timer granularity. Further, the reorder predicting section 501 calculates the packet length required for preventing actual occurrence of reorder, namely, the transmission predicted normal packet length indicating the length of the packet after padding, and notifies the packet padding section 502 of the result. The reorder predicting section 501 has memory 5011 for data storage.

Figure 6:
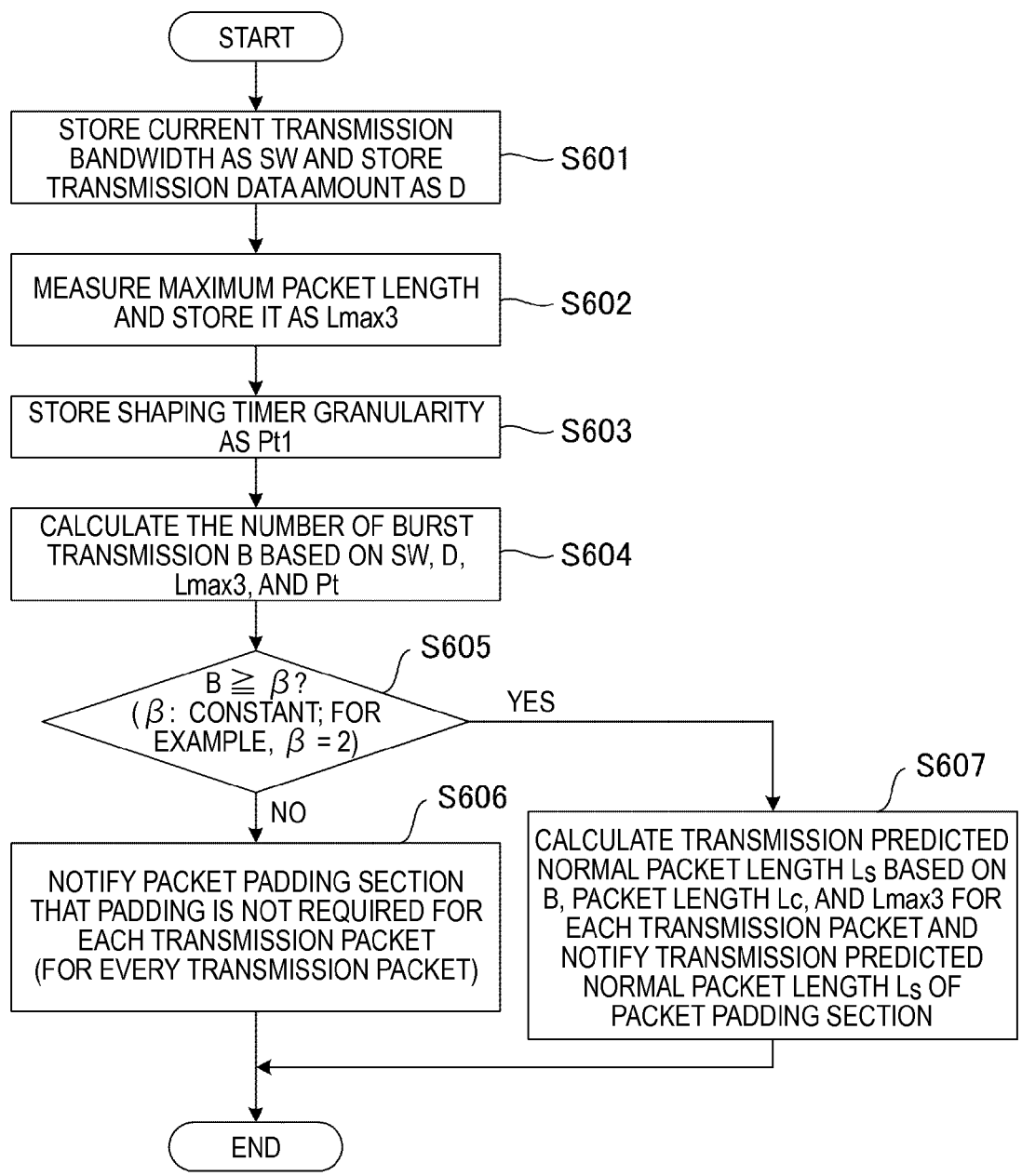
FIG. 6 is a flowchart to describe processing of a reorder predicting section in the transmitter terminal in FIG. 5.
Figure 7:
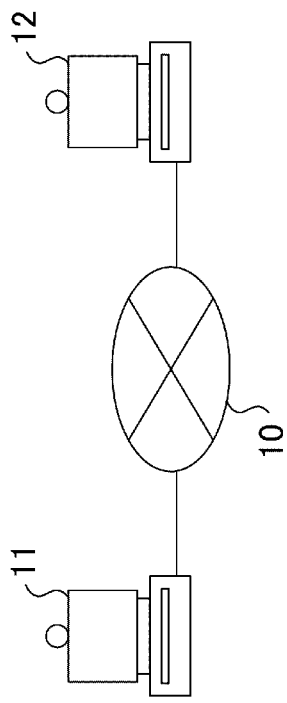
FIG. 7 is a drawing to show the connection state of a transmitter terminal and a receiver terminal.
Figure 8:
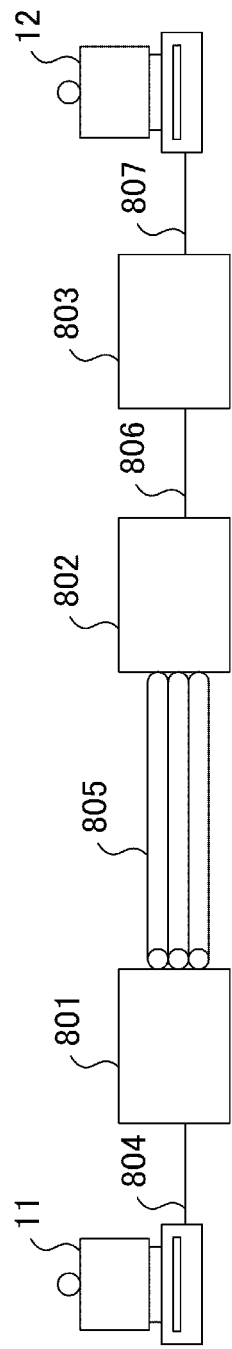
FIG. 8 is a drawing to describe link trunking.

Here, the operation of the reorder predicting section 501 will be discussed in detail with reference to FIG. 6. FIG. 6 is a flowchart to describe details of processing of the reorder predicting section 501. A data generating section 101 generates data every given time and passes the data to the reorder predicting section 501. For example, if an encoder of video is contained, the data generating section 101 generates a specific amount of data for each encode of screen. For example, to encode a screen of 60 frames/second, the data generating section generates data of several tens of kilobytes every 1/60 sec.

When receiving data generated by the data generating section 101, at step S601, the reorder predicting section 501 acquires current transmission bandwidth SW from the packet padding section 502 and stores it in the memory 5011. It also stores data amount D generated by the data generating section 101 in the memory 5011. Next, at step S602, the reorder predicting section 501 acquires maximum packet length Lmax3 from the packet padding section 502 and stores the length in the memory 5011. For the maximum packet length Lmax3, when the packet padding section 502 transmits a packet to the network 10, maximum packet length (MTU: Max Transfer Unit) may be used. The maximum packet length Lmax3 may be the maximum packet length used when data is divided into packets so that the packet padding section 502 transmits packets in specific maximum length or less.

Next, at step S603, the reorder predicting section 501 acquires shaping timer granularity Pt from the packet padding section 502 and stores it in the memory 5011. The shaping timer granularity refers to the time interval for controlling the transmission flow amount so as to transmit a given number of packets every given time when the packet padding section 502 transmits a packet to the network 10. Specifically, when implemented as software, the lower limit of the shaping timer granularity is limited by the granularity of the timer provided by the operating system (OS) of software. For example, in Linux (registered trademark) of an operating system of free-ware, the value of setting the timer granularity of the operating system (HZ) is HZ=1000 and when the finest operation is performed, the timer granularity is 1 millisecond. This system cannot operate at finer time interval (for example, 500 microseconds). The shaping timer granularity is 1 millisecond in this example.

Next, at step S604, the reorder predicting section 501 calculates the number of burst transmission B from the current transmission bandwidth SW, the maximum packet length Lmax3, generated data amount D, and the shaping timer granularity Pt. Specifically, the number of burst transmission B=(D/Lmax3)*8/SW*Pt is calculated and the calculation result is stored in the memory 5011. Next, at step S605, the reorder predicting section 501 determines whether or not the number of burst transmission B is equal to or greater than positive integer constant β. If the number of burst transmission B is equal to or greater than β, step S607 is executed; if the number of burst transmission B is less than β, step S606 is executed. At step S606 (namely, when B<β), the packet padding section 502 is notified that it is not necessary to execute padding for each transmission packet, and data is passed to the packet padding section 502. The packet padding section 502 divides the received data into packets of a specific length if necessary and transmits to the receiver terminal 2A while executing the flow quantity control described above.

On the other hand, at step S606 (namely, when B≥β), the reorder predicting section 501 calculates transmission predicted normal packet length Ls from the number of burst transmission B, the packet length Lc, and the maximum packet length Lmax3. Further, the reorder predicting section 501 notifies the packet padding section 502 of the packet length and passes data to the packet padding section 502. Here, the transmission predicted normal packet length Ls is calculated as Ls=Lc+(Lmax3−Lc)*B/γ (where γ is a constant equal to or greater than B, and Lc is the packet length of the packet to be transmitted). The transmission predicted normal packet length Ls may be operated as γ=B, namely, Ls=Lmax.

When receiving the notification of the transmission predicted normal packet length Ls, the packet padding section 502 divides the received data into packets of a specific length if necessary and transmits to the receiver terminal 2A while executing the flow quantity control described above. At this time, if the length Lc of the packet to be transmitted is equal to or less than Ls, the packet padding section 502 transmits the packet while executing padding so that the packet length becomes Ls.

The operation is performed as described in the Embodiment 2, whereby the transmitter terminal 1A pads a packet to the length with no occurrence of reorder in the network 10 and transmits the packet, so that occurrence of reorder in the network 10 is avoided. It becomes unnecessary for the receiver terminal 2A to buffer packets to sort reordered packets. Consequently, transmission of a real-time stream as the final transmission delay time is shorter is made possible. Particularly, in Embodiment 2, the transmitter terminal 1A determines whether or not execution of padding is required, so that the reorder condition analyzing section 201 and the padding requesting section 204 that the receiver terminal 2 of Embodiment 1 has need not be provided for the receiver terminal 2A and accordingly the receiver terminal 2A becomes inexpensive.

While the invention has been described in detail with reference to the specific embodiments, it will be obvious to those skilled in the art that various changes and modifications can be made without departing from the spirit and the scope of the invention.

The present application is based on Japanese Patent Application (No. 2008-324609) filed on Dec. 19, 2008, the contents of which are incorporated herein by reference.

INDUSTRIAL APPLICABILITY

The invention has advantage that transmission of a real-time stream of audio and video, etc., with shorter final transmission delay time is made possible, and can be applied to a transmitter terminal such as a server for transmitting streaming data in real time such as audio and video and a receiver terminal of a personal computer, a mobile telephone, etc., that can receive streaming data transmitted from the transmitter terminal.

DESCRIPTION OF REFERENCE NUMERALS 1, 1A Transmitter terminal
2, 2A Receiver terminal
10 Network
101 Data generating section
102, 502 Packet padding section
103 Padding request accepting section
201 Reorder condition analyzing section
202, 503 Padding removal section
203 Data reproducing section
204 Padding requesting section
501 Reorder predicting section
1031, 2012, 5011 Memory
2011 Timer

The invention claimed is:

1. A transmitter terminal comprising:
a data generating section of the transmitter terminal that generates data packets;
a padding request accepting section of the transmitter terminal that receives a padding request packet for making a padding request, the padding request packet being generated by and transmitted from a receiver terminal;
the padding request packet containing a specified packet length to which future packets generated by the transmitter terminal should be set through padding such that numerical packet reordering based on packet header number will not be necessary at the receiver terminal for future received padded data packets from the transmitter terminal, the padding request packet being calculated by the receiver terminal based on received data packets from the transmitter terminal; and
a data packet padding section of the transmitter terminal that pads the data packets generated by the data generating section of the transmitter terminal so that a packet length of the data packets becomes the specified packet length or more based on the padding request packet received by the padding request accepting section of the transmitter terminal, and transmits the padded data packets to a network,
wherein the specified packet length is estimated by the receiver terminal based on a number of past reorderings that have occurred and a reception bandwidth at a time of reordering.

2. A receiver terminal comprising:
a reorder condition analyzing section of the receiver terminal that receives data packets from a network and analyzes whether the received data packets need to be numerically reordered by packet header number due to the received packets arriving out of order at the receiver terminal;
the reorder condition analyzing section of the receiver terminal configured to estimate a specified packet length such that numerical packet reordering will not be necessary at the receiver terminal for future received padded data packets from a transmitter terminal;
a data reproducing section of the receiver terminal that reproduces the packets received by the reorder condition analyzing section; and
a padding requesting section of the receiver terminal that generates a padding request packet for transmission to the transmitter terminal to request that the transmitter terminal execute a padding process based on an analysis result of the reorder condition analyzing section such that new data packets generated by the transmitter terminal will include padding to be at the specified packet length such that numerical packet reordering will not be necessary at the receiver terminal,
wherein the specified packet length is estimated by the reorder condition analyzing section based on a number of past reorderings that have occurred and a reception bandwidth at a time of reordering.

3. A packet transmission and reception method comprising:
a data packet generation step of generating data packets by a transmitter terminal;
a packet padding step of padding the data packets generated in the data packet generation step;
a data packet transmission step of transmitting the data packets to a network by the transmitter terminal;
receiving the data packets from the network by a receiver terminal and analyzing an occurrence condition of data packet reordering based on of data packet header numbering in the receiver terminal;
a padding request packet generation step of generating a padding request packet for making a padding request based on an analysis result in the reordering condition analysis by the receiver terminal, the padding request packet including a specified packet length to which future packets generated by the transmitter terminal should be set through padding such that numerical packet reordering based on packet header number will not be necessary at the receiver terminal for future received data packets from the transmitter terminal; and
a padding request packet acceptance step by the transmitter terminal of receiving the padding request packet generated by the receiver terminal;
wherein in the data packet transmission step of the transmitter terminal, the data packets generated in the data packet generation step are padded so that packet lengths of the data packets become the specified packet length or more based on the padding request in the padding request packet acceptance step, and
wherein the specified packet length is estimated by the receiver terminal based on a number of past reorderings that have occurred and a reception bandwidth at a time of reordering.

* * * * *

UNITED STATES PATENT AND TRADEMARK OFFICE
CERTIFICATE OF CORRECTION

PATENT NO. : 8,711,695 B2
APPLICATION NO. : 13/121798
DATED : April 29, 2014
INVENTOR(S) : Eiichi Muramoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 190 days.

Signed and Sealed this

Twenty-ninth Day of September, 2015

Michelle K. Lee
*Director of the United States Patent and Trademark Office*